(12) United States Patent
Israni et al.

(10) Patent No.: US 10,503,441 B2
(45) Date of Patent: Dec. 10, 2019

(54) RESOLVING FAILED OR HANGING MOUNT POINTS IN A CLUSTERED STORAGE SOLUTION FOR CONTAINERS

(71) Applicant: Portworx, Inc., Santa Clara, CA (US)

(72) Inventors: Dinesh Israni, Santa Clara, CA (US); Vinod Jayaraman, San Francisco, CA (US); Goutham Rao, Los Altos, CA (US)

(73) Assignee: Portworx, Inc., Los Altos, CA (US)

( * ) Notice: Subject to any disclaimer, the term of this patent is extended or adjusted under 35 U.S.C. 154(b) by 10 days.

(21) Appl. No.: 15/824,259

(22) Filed: Nov. 28, 2017

(65) Prior Publication Data

US 2019/0163405 A1 May 30, 2019

(51) Int. Cl.
*G06F 3/06* (2006.01)
*H04L 29/08* (2006.01)

(52) U.S. Cl.
CPC ............ *G06F 3/0665* (2013.01); *G06F 3/067* (2013.01); *H04L 67/1097* (2013.01)

(58) Field of Classification Search
CPC ........... G06F 3/06; G06F 3/067; G06F 3/0665
USPC ......................................................... 711/112
See application file for complete search history.

(56) References Cited

U.S. PATENT DOCUMENTS

| | | | | |
|---|---|---|---|---|
| 2010/0017444 | A1* | 1/2010 | Chatterjee | G06F 16/10 707/E17.007 |
| 2013/0097319 | A1* | 4/2013 | Ahmad | G06F 9/5033 709/226 |
| 2013/0275375 | A1* | 10/2013 | Nickolov | G06F 9/4856 707/636 |
| 2017/0344289 | A1* | 11/2017 | Jeong | G06F 3/0619 |
| 2017/0351743 | A1* | 12/2017 | Jayaraman | G06F 16/273 |

* cited by examiner

*Primary Examiner* — Pierre Miche Bataille
(74) *Attorney, Agent, or Firm* — Kwan & Olynick LLP

(57) ABSTRACT

A clustered storage system may include potentially many different nodes, each including a storage driver and a kernel module. A node may mount a virtual storage volume for the use of a container application at the node. The storage driver and kernel module may receive a request from a storage driver at a different node and respond by indicating whether the virtual storage volume is in active use. In this way, the clustered storage system may safely but forcibly unmount a virtual storage volume having a failed or hanging mount point so that the volume may be mounted on a different node.

20 Claims, 6 Drawing Sheets

RESOLVING FAILED OR HANGING MOUNT POINTS IN A CLUSTERED STORAGE SOLUTION FOR CONTAINERS

TECHNICAL FIELD

The present disclosure relates generally to containerized applications and more specifically to containerized scalable storage applications.

DESCRIPTION OF RELATED ART

One of the most difficult challenges facing software developers is interoperability of software between different computing environments. Software written to run in one operating system typically will not run without modification in a different operating system. Even within the same operating system, a program may rely on other programs in order to function. Each of these dependencies may or may not be available on any given system, or may be available but in a version different from the version originally relied upon. Thus, dependency relationships further complicate efforts to create software capable of running in different environments.

In recent years, the introduction of operating-system-level virtualization has facilitated the development of containerized software applications. A system configured with operating-system-level virtualization includes a container engine that operates on top of the operating system. Importantly, the container engine is configured to operate interchangeably in different environments (e.g., with different operating systems). At the same time, the container engine is configured to present a standardized interface to one or more software containers.

Each software container may include computer programming code for performing one or more tasks. Examples of software containers include web servers, email servers, web applications, and other such programs. Each software container may include some or all of the software resources that the software in the container needs in order to function. For example, if a software container includes a web application written in the Python programming language, the software container may also include the Python programming language modules that the web application relies upon. In this way, the software container may be installed and may execute successfully in different computing environments as long as the environment includes a container engine.

SUMMARY

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Various embodiments of the present invention relate generally to devices, systems, and methods for facilitating the correction of failed or hanging mount points in a containerized storage system. According to various embodiments, a computing device may include a communications interface, a processor, and memory.

According to various embodiments, the communications interface may be operable to receive from a remote computing node a virtual storage volume activity request message addressed to a storage driver implemented at the computing device. The virtual storage volume activity request message may identify a virtual storage volume mounted at the computing device and configured to access data stored on one or more storage devices accessible via a network.

According to various embodiments, a processor operable to determine whether the virtual storage volume is associated with one or more block device references in an operating system running at the computing device, wherein the determination is made based on communications between the storage driver and a kernel module associated with the operating system.

According to various embodiments, the memory may be operable to store one or more block device references. The processor may also be operable to instruct the communications interface to transmit a virtual storage volume activity response message from the storage driver to the remote computing node. The message may indicate whether the virtual storage volume is associated with one or more block device references in the operating system.

In particular embodiments, the virtual storage volume may be configured as a data storage service within a containerized application system configured to run a plurality of distributed application instances within the operating system, where each application instance corresponds with a designated application. The plurality of distributed applications may include the storage driver. In some configurations, the one or more storage devices may include at least two storage devices.

In particular embodiments, the request message may be sent in response to a mount request to mount the virtual storage volume at the remote computing device. The virtual storage volume may be in a non-responsive state in which the virtual storage volume is not responding to storage requests. In addition, in some configurations the virtual storage volume is not associated with one or more block device references. In such configurations, the virtual storage volume activity response message may indicate that the virtual storage volume may be safely mounted at the remote computing device. A selected one of the one or more block device references may include a respective identifier associated with a respective open file accessible via the virtual storage volume.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Figure 1:
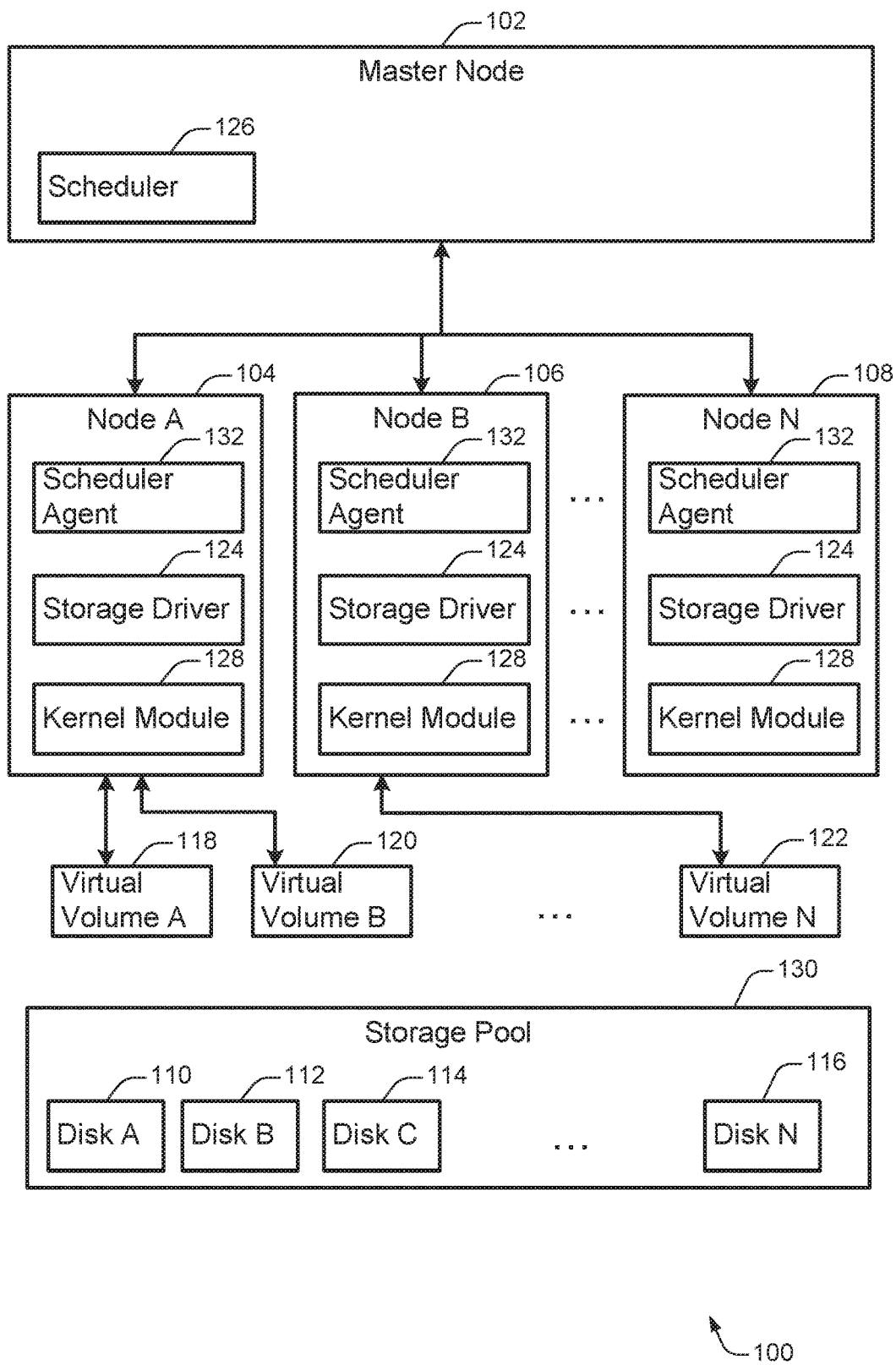
FIG. 1 illustrates an example of an arrangement of components in a containerized storage system, configured in accordance with one or more embodiments.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular containerized storage environments. However, it should be noted that the techniques of the present invention apply to a wide variety of different containerized storage environments. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Techniques and mechanisms described herein provide for resolving failed or hanging mount points in a clustered storage solution for containers. A containerized application system is one in which an application instance may be created as a container at a computing node based on an application image. In many configurations, a virtual storage volume may be mounted on a disk connected with an application instance on such a node. Importantly, the system must ensure that the virtual storage volume is not simultaneously mounted on two different nodes since writing data to the same virtual storage volume from more than one source tends to quickly corrupt the virtual storage volume. According to techniques and mechanisms described herein, containerized storage volumes implemented at each node may communicate with each other and with kernel plugins implemented at each node to determine whether a virtual storage volume is being actively used, even if the virtual storage volume is mounted but in a failed or hanging state.

Example Embodiments

In a containerized application system such as Docker, each compute node implements a container layer that runs in an operating system. The container layer acts as an intermediate layer to facilitate the execution of one or more container applications. The container system is standardized so that a container application may be instantiated on any of various operating systems and on any of various types of hardware.

In many configurations, potentially many instances of a container application are created on potentially many different nodes. A clustered storage solution can be employed to provide access to data. In a clustered storage solution, a virtual storage volume can be created. Such a virtual storage volume can span potentially many different physical disks and can be made accessible to any of the nodes.

The process of making a virtual storage volume available for writing on a disk attached to a particular storage node is referred to as "mounting". Importantly, the clustered storage solution must ensure that a virtual storage volume is mounted for writing by no more than a single node since simultaneous writes by different nodes tends to quickly corrupt a storage volume.

In a clustered storage solution for containers, schedulers are in charge of moving around volume mount points across a cluster so that containers always have access to their persistent data. Examples of schedulers may include, but are not limited to: Kubernetes, Mesos, and Swarm.

One challenge faced by schedulers is addressing failed or hanging mount points. For example, a component may request to mount a virtual storage volume on a first node, but the scheduler may determine that the virtual storage volume is still mounted on a second node. If the second node is actively using the virtual storage volume, then the mount request by the first node should fail. However, in some instances, an error condition such as a software bug, network failure, systems crash, or other problem may have occurred on the second node that has caused the virtual storage volume to be placed in a state of failure such as having a hanging mount point. For example, the storage container driver at the second node may crash. As another example, the second node may be unreachable to the scheduler due to a network failure. As yet another example, the storage driver may either not have received an unmount call or an unmount call was never sent by the user of a storage volume. When in a failure state, the virtual storage volume may appear to the scheduler be mounted on the second node but may not actually be in use by the second node. However, the failed volume may not be usable by another node in a conventional system even though no application is using the volume.

In conventional systems, the second node is unable to recover from the failure condition, and the virtual storage volume is likely to persist in the failure state. Further, the schedule in conventional systems has no way to remedy the failure or even determine that the virtual storage volume is not in active use at the second node. Accordingly, in a conventional system the virtual storage volume would typically remain in a state of failure until a human manually intervened by correcting the error condition. While the virtual storage volume remained in the state of failure, it would be inaccessible by any node in the clustered storage solution.

In a conventional storage solution, the storage is provided through a network protocol such as iSCSI. When the scheduler requests that a hung volumes be mounted on another node, the conventional storage driver that implements the network protocol does not have a method to detect whether the volume is still being used or not. They would only know that the volume is currently mounted on another node and therefore not usable on any other node.

Also, in a conventional storage solution, volumes are used from within a container application associated with one entity, while the clustered storage solution is provided by a different entity. In this case, it is typically impossible in a conventional storage system for the storage provider to query the namespace of the container to figure out whether the volume is being used or not.

In a conventional storage solution, the problem is compounded by the many different types of container technologies being deployed. For example, the REX-Ray container storage driver can be used with backing storages like Amazon EBS to provide volumes to containers. However, when EBS volumes are attached to an EC2 instance, they cannot be attached to another EC2 instance. Thus, if a scheduler or orchestrator does not request REX-Ray to detach the EBS volume from the node where it is no longer being used, REX-Ray will not be able to use the same EBS volume on another node. REX-Ray also does not have a way to determine whether the EBS volume is being used on the node where it is mounted. Thus, in this case REX-Ray cannot unmount it to be used by another node.

In many conventional storage systems, such as those in which a protocol such as iSCSI is employed, the storage provider has a minimal presence on the nodes where the volume is being used and cannot gather information about the usage of the volume on the node. Such configurations do not allow seamless correction of hanging mount points or other error conditions. In these cases, manual intervention would be required to forcefully unmount these volumes before they can be used in the cluster again. This hampers automation and high availability of services.

According to various embodiments, techniques and mechanisms described herein allow a clustered storage solution to determine whether a volume is actually being used by a container or client on a node on which the volume is mounted. The system allows a volume to be mounted on a different storage node only if it is no longer in active use by the previous storage node, which eliminates data corruption and service downtime that may result from the volume being simultaneously accessed by different nodes.

According to various embodiments, each compute node may include a storage driver and an operating system kernel module. The kernel module may be used to expose virtual block devices and to keep a track of the number of open handles on the block device. Using this information, the storage driver can check whether the block device is actually being used on that node or if it is safe to remove the block device.

According to various embodiments, a "best effort" approach may be employed to try to unmount a volume if it is already mounted on another node or if the node on which the volume was previously mounted is unreachable (e.g., marked as offline in a storage cluster). For example, the system may first attempt to unmount a volume from the node where it is mounted. If at that time the kernel module indicates that the volume is in active use on the node, then the unmount from the remote node would fail and the mount operation on the new node would fail as well. If instead no open file hands exist, then no client is using the volume and the system is free to unmount the volume on the old node and re-mount it on the new node so that the container can continue its execution.

According to various embodiments, techniques and mechanisms described herein may be used to guarantees that a container will always have access to its data across a cluster from any node when using a clustered storage solution even when components like container schedulers and orchestrators have errors in which they do not behave according to their contract for volume state lifecycles. Further, techniques and mechanisms described herein may eliminate the need for manual intervention in the event of failures or errors introduced into volume management by container schedulers or orchestrators.

According to various embodiments, techniques and mechanisms described herein provide for seamless fail overs of containers without affecting the consistency of the data on the volumes even in cases where conventional approaches would have required manual intervention. Accordingly, techniques and mechanisms described herein can result in lower downtime for services and fewer things for users to automate and worry about. Thus, techniques and mechanisms described herein provide for the more efficient usage of storage resources on storage nodes and the improved functioning of distributed storage systems.

Techniques and mechanisms described herein may facilitate the operation of a scalable storage container node system. In some embodiments, a scalable storage container node system may allow application containers in a virtualized application system to quickly and directly provision and scale storage. Further, the system may be configured to provide one or more user experience guarantees across classes of applications. According to various embodiments, the system may pool the capacity of different services into virtual storage volumes and auto-allocate storage as application storage traffic scales or bursts. For instance, a single virtual storage volume may include hundreds or thousands of terabytes of storage space aggregated across many different storage devices located on many different physical machines.

In some embodiments, storage containers may communicate directly with server resources such as hardware storage devices, thus reducing or eliminating unnecessary virtualization overhead. Storage containers may be configured for implementation in a variety of environments, including both local computing environments and cloud computing environments. In some implementations, storage volumes created according to the techniques and mechanisms described herein may be highly failure-tolerant. For example, a virtual storage volume may include data stored on potentially many different storage nodes. A storage node may fail for any of various reasons, such as hardware failure, network failure, software failure, or server maintenance. Data integrity may be maintained even if one or more nodes that make up a storage volume fail during data storage operations.

According to various embodiments, a storage system that allows access by different computing devices is referred to herein as a "distributed storage system." Alternately, or additionally, such a storage system may be referred to herein as a "clustered storage system."

FIG. 1 illustrates an example of an arrangement of components in a containerized storage system 100, configured in accordance with one or more embodiments. The storage system 100 includes a master node 102 in communication with a plurality of application nodes 104, 106, and 108. Each node has implemented thereon a storage driver 124, a kernel module 128, and a scheduler agent 132. In addition, the master node includes a scheduler 126. Each node can mount one or more of a plurality of virtual volumes 118, 120, and 122. Each virtual volume can include storage space on one or more of a plurality of storage disks 110, 112, 114, and 116 in a storage pool 130.

According to various embodiments, the clustered storage system 100 shown in FIG. 1 may be implemented in any of various physical computing contexts. For example, some or all of the components shown in FIG. 1 may be implemented in a cloud computing environment such as Amazon Web Services (AWS), Microsoft Azure, or Google Cloud. As another example, some or all of the components shown in FIG. 1 may be implemented in a local computing environment such as on nodes in communication via a local area network (LAN) or other privately managed network.

Figure 5:
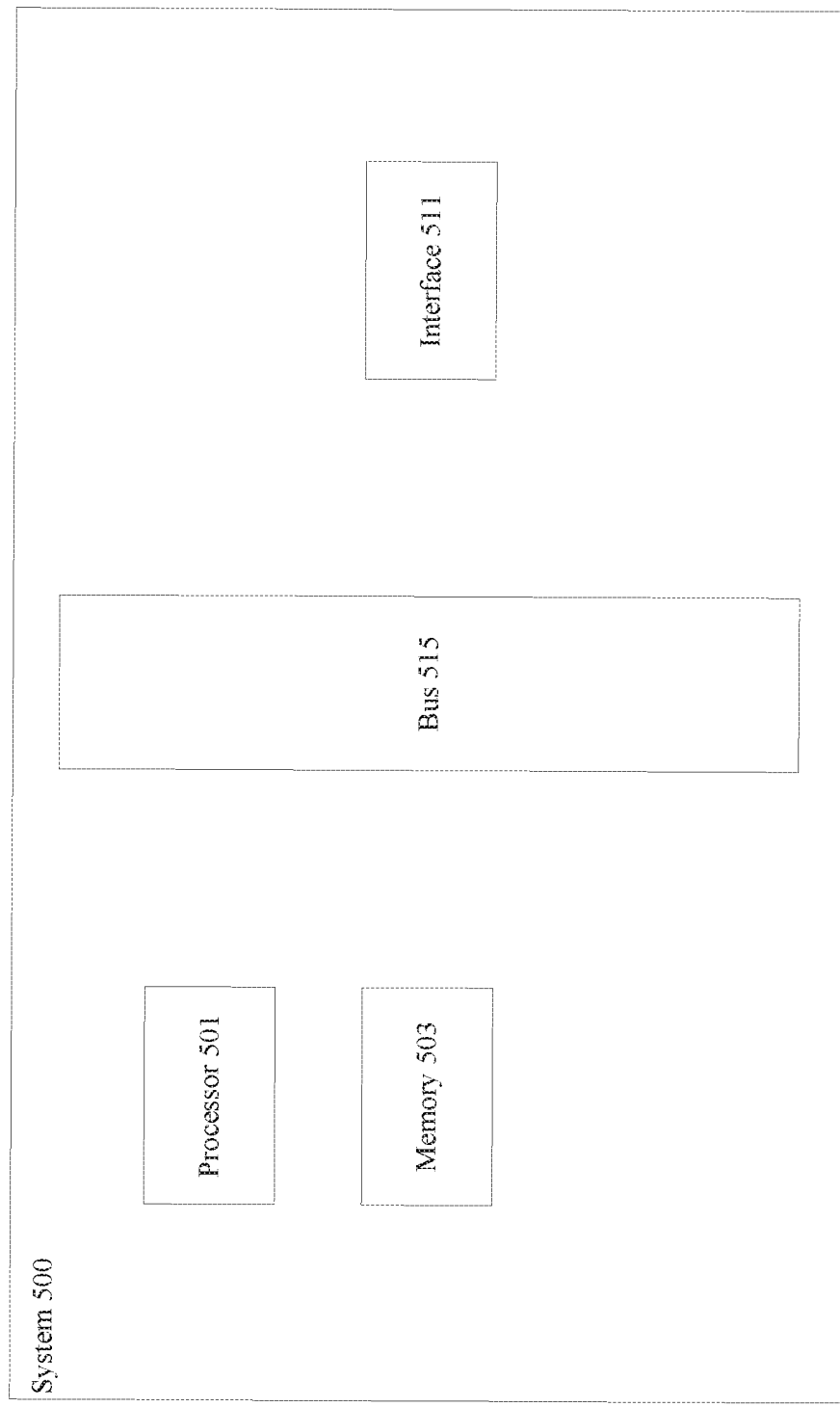
FIG. 5 illustrates an example of a server, configured in accordance with one or more embodiments.

In some implementations, a node is an instance of a container system implemented on a computing device such as the computing device shown in FIG. 5. In some configurations, multiple nodes may be implemented on the same physical computing device. Alternately, a computing device may contain a single node. An example configuration of a container node is discussed in further detail with respect to FIG. 2.

According to various embodiments, each node may be configured to instantiate and execute one or more containerized application instance. Each node may include many components not shown in FIG. 1. These components may include hardware components, such as those discussed with respect to FIG. 5, and/or software components, such as those discussed with respect to FIG. 2.

According to various embodiments, each node may include a storage driver 124. The storage driver 124 may perform any of various types of storage-related operations for the node. For example, the storage driver 124 may facilitate the mounting or unmounting of virtual storage volumes. As another example, the storage driver 124 may facilitate data storage or retrieval requests associated with a mounted virtual storage volume. The storage driver 124 may be substantially similar or identical to the privileged storage container 216 shown in FIG. 2.

In some embodiments, each node may include a kernel module 128. The kernel module may receive from the storage driver a request to unmount a virtual volume. The kernel module may then identify a number of references to the virtual volume. Such a reference may be referred to herein as a block device reference. Each reference may reflect an open file handle or other such interaction between the file system and the virtual volume. If the reference count is zero, then the kernel module may unmount the virtual volume and return a message indicating success. If instead the reference count is positive, then the kernel module may return a message indicating failure.

According to various embodiments, each node may include a scheduler agent 132. The scheduler agent 132 may facilitate communications between nodes. For example, the scheduler 126 in the master node may communicate with the scheduler agent 132. The scheduler agent 132 may then communicate with the storage driver 124 to perform an operation such as unmounting a virtual volume.

In some implementations, the disks 110, 112, 114, and 116 may be accessible to the container nodes via a network. For example, the disks may be located in storage arrays containing potentially many different disks. In such a configuration, which is common in cloud storage environments, each disk may be accessible for potentially many nodes to access. A storage pool such as the pool 130 may include potentially many different disks.

According to various embodiments, the virtual storage volumes 118, 120, and 122 are logical storage units created by the distributed storage system, of which the kernel modules and storage drivers are a part. Each virtual storage volume may be implemented on a single disk or may span potentially many different physical disks. At the same time, data from potentially many different virtual volumes may be stored on a single disk. In this way, a virtual storage volume may be created that is potentially much larger than any available physical disk. At the same time, a virtual storage volume may be created in such a way as to be robust to the failure of any individual physical disk. Further, the virtual storage volume may be created in such a way as to allow rapid and simultaneous read access by different nodes. Thus, a single virtual storage volume may support the operation of containerized applications implemented in a distributed fashion across potentially many different nodes.

In some embodiments, the master node 102 is configured to manage the operations of the clustered storage system. For example, the scheduler 126 at the master node 102 may be configured to receive a request to mount a virtual volume for use at a particular node. The scheduler 126 may then communicate with that node to provide instructions to mount the virtual volume.

Figure 2:
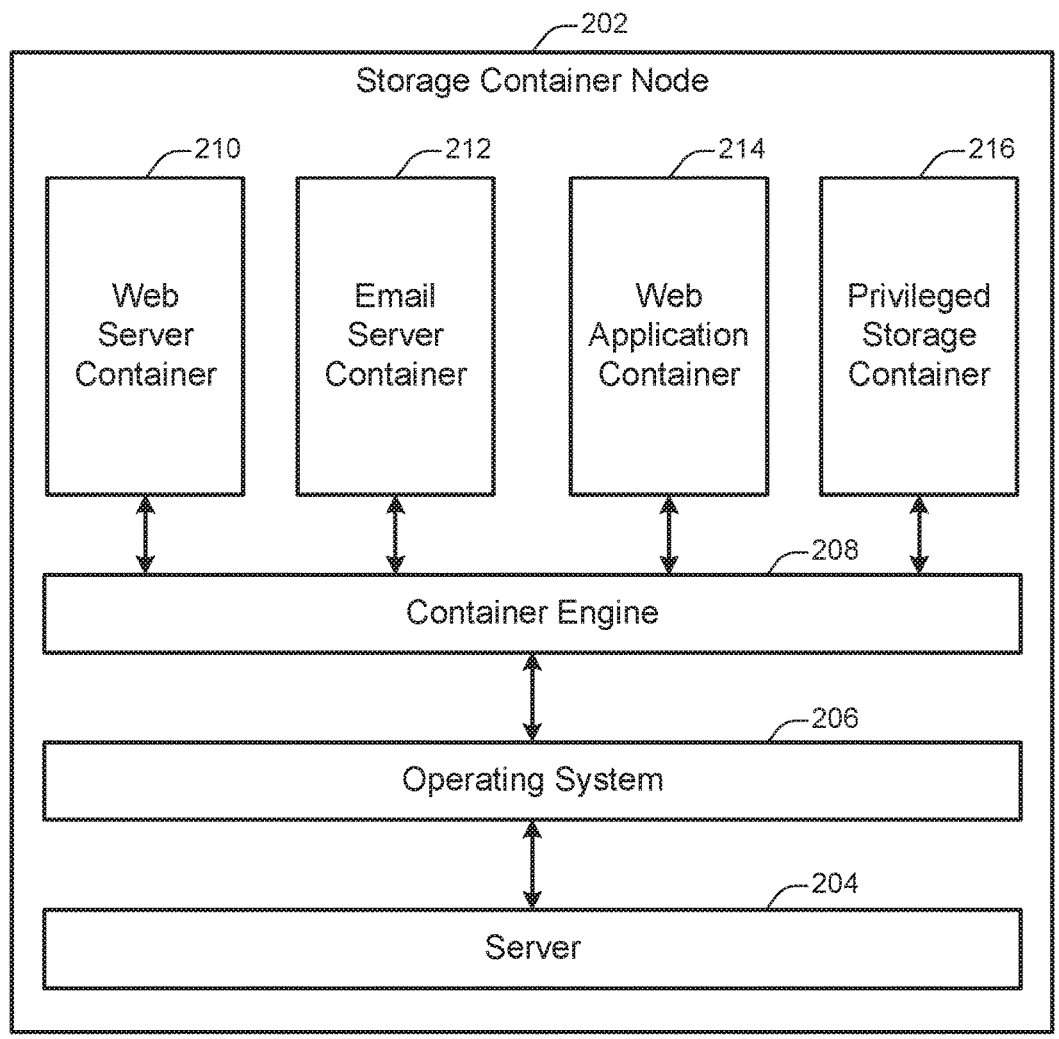
FIG. 2 illustrates an example of a storage container node, configured in accordance with one or more embodiments.

FIG. 2 illustrates an example of a storage container node 202. According to various embodiments, a storage container node may be a server configured to include a container engine and a privileged storage container. The storage container node 202 shown in FIG. 2 includes a server layer 204, an operating system layer 206, a container engine 208, a web server container 210, an email server container 212, a web application container 214, and a privileged storage container 216.

In some embodiments, the storage container node 202 may serve as an interface between storage resources available at a server instance and one or more virtual storage volumes that span more than one physical and/or virtual server. For example, the storage container node 202 may be implemented on a server that has access to a storage device. At the same time, a different storage container node may be implemented on a different server that has access to a different storage device. The two storage nodes may communicate to aggregate the physical capacity of the different storage devices into a single virtual storage volume. The single virtual storage volume may then be accessed and addressed as a unit by applications running on the two storage nodes or at on another system.

At 204, the server layer is shown. According to various embodiments, the server layer may function as an interface by which the operating system 206 interacts with the server on which the storage container node 202 is implemented. A storage container node may be implemented on a virtual or physical server. For example, the storage container node 202 may be implemented at least in part on the server shown in FIG. 5. The server may include hardware such as networking components, memory, physical storage devices, and other such infrastructure. The operating system layer 206 may communicate with these devices through a standardized interface provided by the server layer 204.

At 206, the operating system layer is shown. According to various embodiments, different computing environments may employ different operating system layers. For instance, a physical or virtual server environment may include an operating system based on Microsoft Windows, Linux, or Apple's OS X. The operating system layer 206 may provide, among other functionality, a standardized interface for communicating with the server layer 204.

At 208, a container engine layer is shown. According to various embodiments, the container layer may provide a common set of interfaces for implementing container applications. For example, the container layer may provide application programming interfaces (APIs) for tasks related to storage, networking, resource management, or other such computing tasks. The container layer may abstract these computing tasks from the operating system. A container engine may also be referred to as a hypervisor, a virtualization layer, or an operating-system-virtualization layer.

In some implementations, the separation of the computing environment into a server layer 204, an operating system layer 206, and a container engine layer 208 may facilitate greater interoperability between software applications and greater flexibility in configuring computing environments. For example, the same software container may be used in different computing environments, such as computing environments configured with different operating systems on different physical or virtual servers.

At storage container node may include one or more software containers. For example, the storage container node 202 includes the web server container 220, the email server container 212, and the web application container 214. A software container may include customized computer code configured to perform any of various tasks. For instance, the web server container 220 may provide files such as webpages to client machines upon request. The email server 212 may handle the receipt and transmission of emails as well as requests by client devices to access those emails. The web application container 214 may be configured to execute any type of web application, such as an instant messaging service, an online auction, a wiki, or a webmail service. Although that storage container node 202 shown in FIG. 2 includes three software containers, other storage container nodes may include various numbers and types of software containers.

At 216, a privileged storage container is shown. According to various embodiments, the privileged storage container may be configured to facilitate communications with other storage container nodes to provide one or more virtual storage volumes. A virtual storage volume may serve as a resource for storing or retrieving data. The virtual storage volume may be accessed by any of the software containers 220, 212, and 214 or other software containers located in different computing environments. For example, a software container may transmit a storage request to the container engine 208 via a standardized interface. The container engine 208 may transmit the storage request to the privileged storage container 216. The privileged storage container 216 may then communicate with privileged storage containers located on other storage container nodes and/or may communicate with hardware resources located at the storage container node 202 to execute the request.

In some implementations, one or more software containers may be afforded limited permissions in the computing environment in which they are located. For example, in order to facilitate a containerized software environment, the software containers 210, 212, and 214 may be restricted to communicating directly only with the container engine 208 via a standardized interface. The container engine 208 may then be responsible for relaying communications as necessary to other software containers and/or the operating system layer 206.

In some implementations, the privileged storage container 216 may be afforded additional privileges beyond those afforded to ordinary software containers. For example, the privileged storage container 216 may be allowed to communicate directly with the operating system layer 206, the server layer 204, and/or one or more physical hardware components such as physical storage devices. Providing the storage container 216 with expanded privileges may facilitate efficient storage operations such as storing, retrieving, and indexing data.

Figure 3:
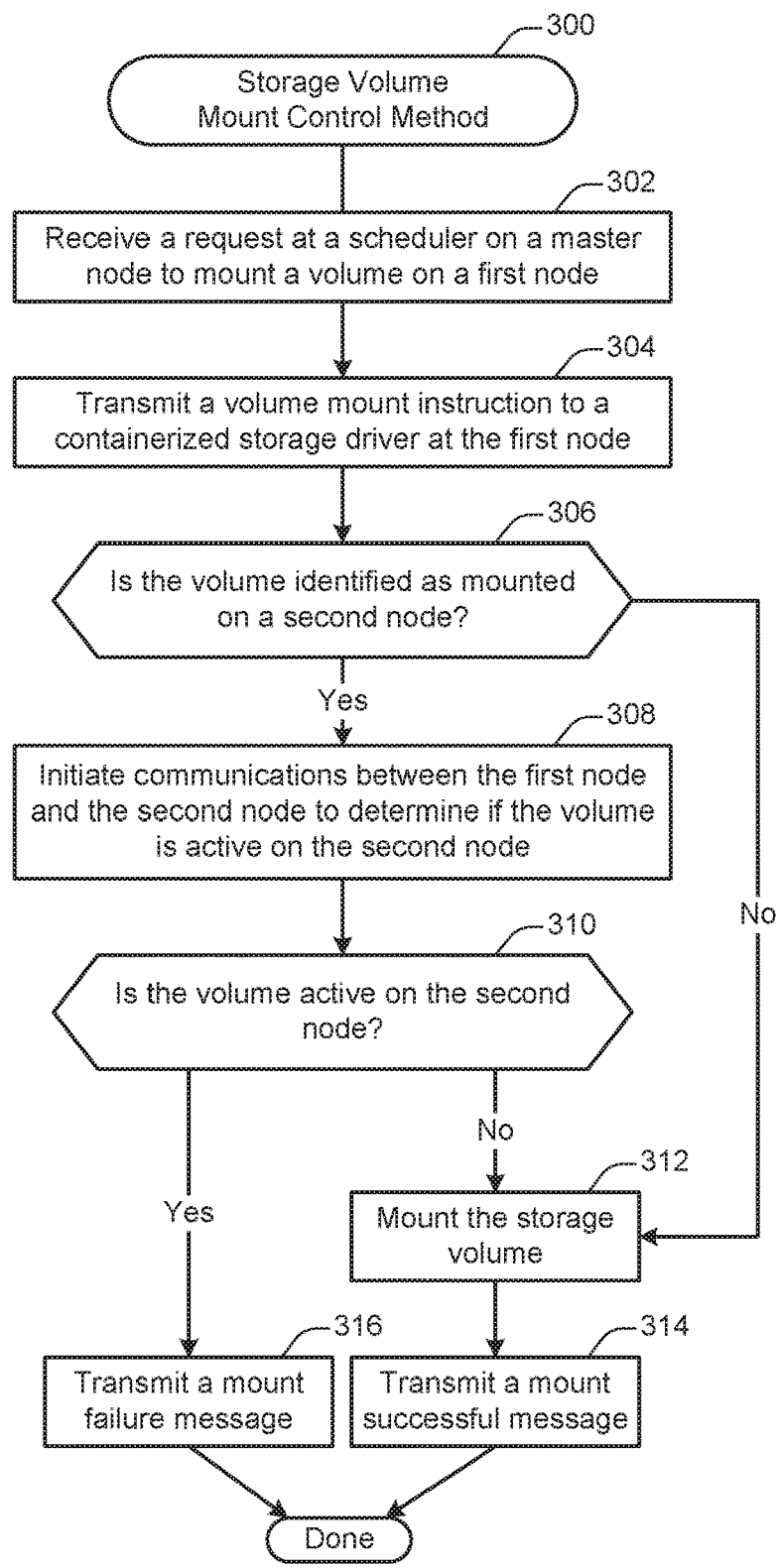
FIG. 3 illustrates an example of a method for controlling the mounting a storage volume, performed in accordance with one or more embodiments.

FIG. 3 illustrates an example of a method 300 for controlling the mounting of a storage volume, performed in accordance with one or more embodiments. The method 300 may be performed at a storage node, such those shown in FIG. 1. The method 300 may be employed to mount a virtual storage volume that is potentially already mounted at a different node. For example, the method 300 may be employed to switch a virtual storage volume from one node to another, even if the virtual storage volume is "hung" or in a nonresponse state in which the virtual storage volume is not responding to storage requests.

In one example, the method 300 may be implemented at the node B 106 shown in FIG. 1. For instance, the Node B 106 may receive a request to mount the Virtual Volume A 118, which in FIG. 1 is currently mounted on Node A 104. The Virtual Volume A 118 may be in any of various states. For example, the Virtual Volume A 118 may be in active use by Node A 104, in which case forcibly unmounting the Virtual Volume A 118 from Node A 104 and re-mounting it on Node B 106 may result in data corruption on the Virtual Volume A 118. As another example, the Virtual Volume A 118 may not be in active use by Node A 104, in which case the Virtual Volume A 118 may be safely unmounted from Node A 104 and remounted on Node B 106. As yet another example, the Virtual Volume A 118 may be in a "hung" or non-responsive state in which it is not responding to storage requests.

At 302, a request is received at a scheduler on a master node to mount a volume on a first node. According to various embodiments, the request may be generated by an application such as a containerized application instance or a storage driver implemented at the first node. For instance, the request may be received at the schedule 126 shown in FIG. 1 and may include a request to mount the Virtual Volume A 118 on Node B 106.

At 304, a volume mount instruction is transmitted to a containerized storage driver at the first node. For example, the volume mount instruction may be transmitted from the scheduler 126 to the storage driver 124 at the Node B 106. According to various embodiments, the volume mount instruction may include information indicating to the storage driver that the storage driver should attempt to mount the virtual volume. For example, the volume mount instruction may include information such as an identifier associated with the virtual volume, one or more disks on which data associated with the virtual volume is stored, and/or a node at which the virtual volume is currently mounted.

At 306, a determination is made as to whether the volume is identified as currently mounted on a second node. According to various embodiments, the determination may be made based on information received along with the volume mount instruction. For instance, the scheduler may track which virtual volumes are mounted on which nodes and transmit this information to the first node.

In particular embodiments, the determination may be made based on information maintained at the first node. For example, the Storage Driver 124 at the Node B 106 may communicate with storage drivers at other nodes to track which virtual volumes are mounted on which nodes.

At 308, if the volume is identified as mounted on the second node, then communications between the second node and the first node are initiated to determine if the volume is active on the second node. For example, the Node B 106 may communicate directly with the Storage Driver 124 at the Node A 104 via a network. Alternately, or additionally, the scheduler 126 may communicate with the Storage Driver 124 at the Node A 104. According to various embodiments, the communications between the second node and the first node may include information such as an identifier associated with the virtual volume, an identifier associated with the first node, and any other relevant information employed by the second node to provide a response to the request.

At 310, a determination is made as to whether the volume is active on the second node. In some embodiments, the determination may be made based on a communication with the storage driver at the second node. For example, the kernel module may keep track of reference counts that may indicate connections such as open file handles associated with various storage volumes. The storage driver 124 may then send a message to the kernel module that identifies the virtual volume. The kernel module may use an identifier included in the message to determine whether the identified virtual storage volume is associated with any references such as open file handles. Each open file handle may be associated with a file that is opened for reading or writing on a particular storage volume. Thus, the presence of a reference to the virtual volume may indicate the presence of an open file handle or other such connection, which may indicate that the virtual storage volume is in active use by the second node.

A situation in which a storage volume is ostensibly mounted but is not responding to requests is referred to herein as a "hanging mount point" or a "hung" storage volume. In particular embodiments, the determination made at operation 310 can be made successfully identify whether the virtual storage volume is in active use even if the storage volume is in a "hung" or unresponsive state in which it is not responding to storage requests. A storage volume may enter such a state for any of various reasons. For example, an error conduction may result from network failure in communications between the node and a disk on which data associated with the storage volume is located. As another example, an error conduction may result from a software bug in the storage driver, the operating system, an application communicating with the storage volume, or another application. Nevertheless, identifying reference counts is a basic feature of an operating system, so the kernel module can identify whether a virtual volume is associated with reference counts even if the virtual storage volume is not responding to messages.

According to various embodiments, the determination made at 310 may involve a response message transmitted from the second node as to whether the identified storage volume is associated with any open filed handles. If the identified storage volume is associated with one or more references, then the determination may be made that the volume is active. If instead the identified storage volume is not associated with one or more references, then the determination may be made that the volume is not active.

At 316, if the volume is active on the second node, then a mount failure message is transmitted. According to various embodiments, the mount failure message may include information such as an identifier associated with the virtual storage volume and/or the node at which the virtual storage volume is currently mounted. The mount failure message may be transmitted to any of various recipients, which may include, but are not limited to: the scheduler at the master node, the storage driver at other storage nodes, and one or more reporting modules configured for activity tracking.

At 312, if the volume is not active on the second node, then the storage volume is mounted on the first node. According to various embodiments, mounting is a process which operating system makes files and directories on a storage volume available for users and applications to access via the computer's file system. In general, the process of mounting includes the operating system acquiring access to the storage volume and then recognizing, reading, and processing file system structure and metadata on it. After that, the file system on the virtual storage volume is registered to the virtual file system component in the operating system. The location in the VFS associated with the newly-mounted virtual storage system is referred to as a mount point. An opposite process of mounting is called unmounting, in which the operating system cuts off all user access to files and directories on the mount point, writes the remaining queue of user data to the storage device, refreshes file system metadata, and then relinquishes access to the virtual storage volume. After unmounting, the virtual storage volume is safe to mount on other nodes.

At 314, a mount success message is transmitted when the virtual volume is successfully mounted. According to various embodiments, the mount success message may include information such as an identifier associated with the virtual storage volume and/or the node at which the virtual storage volume is currently mounted. The mount success message may be transmitted to any of various recipients, which may include, but are not limited to: the scheduler at the master node, the storage driver at other storage nodes, and one or more reporting modules configured for activity tracking.

In particular embodiments, the method 300 may be employed to control operations other than mounting, such as attachment. For example, when the storage driver receives a request to attach a disk to the node, the driver may first check whether the disk is attached on any other node. If it is attached on a second node, then a request may be send from the first node to the second to unmount the disk on that second node. If the detach is successful, then the device may be attached locally. Thus, although the method 300 refers to "mounting" as the operation being controlled, the method 300) is not limited to the control of mounting operations.

Figure 4:
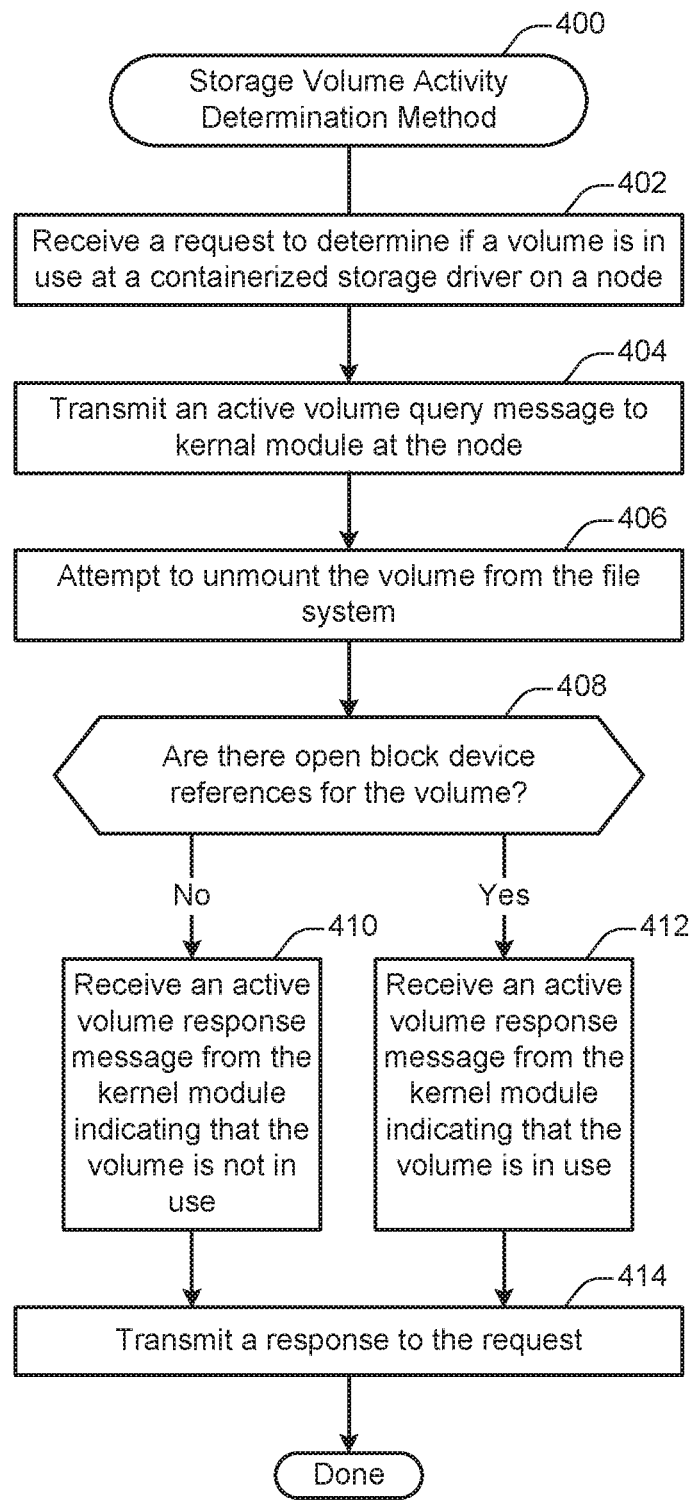
FIG. 4 illustrates an example of a method for determining storage volume activity, performed in accordance with one or more embodiments.

FIG. 4 illustrates an example of a method 400 for determining storage volume activity, performed in accordance with one or more embodiments. According to various embodiments, the method 400 may be performed at a node in a distributed storage system, such as the node A 104 shown in FIG. 1. For example, the method 400 may be performed at a storage driver in communication with a kernel module at the node.

At 402, a request to determine if a volume is in use at a containerized storage driver on a node is received. According to various embodiments, the request may be received from a storage driver implemented at a different storage node than the one at which the method 400 is performed. For example, the request may be received from a storage driver implemented at a storage node at which a request has been received to mount a virtual storage volume that is indicated as currently being mounted on the node at which the method 400 is being performed. In this case, the request may be received in association with the communications initiated at operation 308 shown in FIG. 3.

At 404, an active volume query message is transmitted to the kernel module at the node. According to various embodiments, the active volume query message may include information identifying the virtual storage volume. The active volume query message may also include other information, such as information characterizing the request or authentication information authorizing the request.

At 406, an attempt is made to unmount the volume from the file system. The node may attempt to unmount the volume at least in part because the mount itself may be associated with an open handle for the volume. Further, if the path has been bind mounted inside the container, then it may also have an open handle for the volume, which would prevent the system from detaching the volume because it would appear to be in use by a container.

At 408, a determination is made as to whether one or more open references exist for the volume, which is also referred to herein as a block device. For example, a reference may refer to a file handle is a number that the operating system assigns temporarily to a file when it is opened. Each file handle may include information such as a unique identifier, the identity of the volume on which the file resides, and the identity and/or location on disk of the file. The operating system uses the file handle internally when accessing the file, and the operating system removes the file handle when the file is closed. Thus, a single virtual storage volume may be associated with potentially many different file handles if many different files stored on the virtual storage volume have been opened for access.

According to various embodiments, the presence of a reference to the virtual storage volume may indicate that the virtual storage volume is in an unstable state in which the operating system may be in the process of writing data to the virtual storage volume. For example, unmounting the file system while a file handle is open is likely to lead to data corruption since the writing process may be interrupted.

In some embodiments, the determination as to whether references exist for the block device may be made by the kernel module. For example, the kernel module may use the identifying information included in the request to query a special area of memory that is reserved for tracking references.

At 410, if the kernel module determines that no references exist for the block device, then an active volume response message is received from the kernel module indicating that the volume is not in use. If instead the kernel module determines that one or more references exist for the block device, then at 410 an active volume response message is received from the kernel module indicating that the volume is in use.

According to various embodiments, the active volume response message may be transmitted from the kernel module within a node to the storage driver implemented at the same node. For example, the active volume response message may be transmitted from the kernel module 128 to the storage driver 124 shown in FIG. 1.

At 414, a response to the request is transmitted. In some embodiments, the response may be transmitted to the entity that transmitted the request. For example, the response may be transmitted via a network to a different node. As another example, the response may be transmitted to a process implemented on the node itself.

FIG. 5 illustrates one example of a server. According to particular embodiments, a system 500 suitable for implementing particular embodiments of the present invention includes a processor 501, a memory 503, an interface 511, and a bus 515 (e.g., a PCI bus or other interconnection fabric) and operates as a container node. When acting under the control of appropriate software or firmware, the processor 501 is responsible for implementing applications such as an operating system kernel, a containerized storage driver, and one or more applications. Various specially configured devices can also be used in place of a processor 501 or in addition to processor 501. The interface 511 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 500 is a server configured to run a container engine. For example, the system 500 may be configured as a storage container node as shown in FIG. 1. The server may include one or more hardware elements as shown in FIG. 5. In some implementations, one or more of the server components may be virtualized. For example, a physical server may be configured in a localized or cloud environment. The physical server may implement one or more virtual server environments in which the container engine is executed. Although a particular server is described, it should be recognized that a variety of alternative configurations are possible. For example, the modules may be implemented on another device connected to the server.

Figure 6:
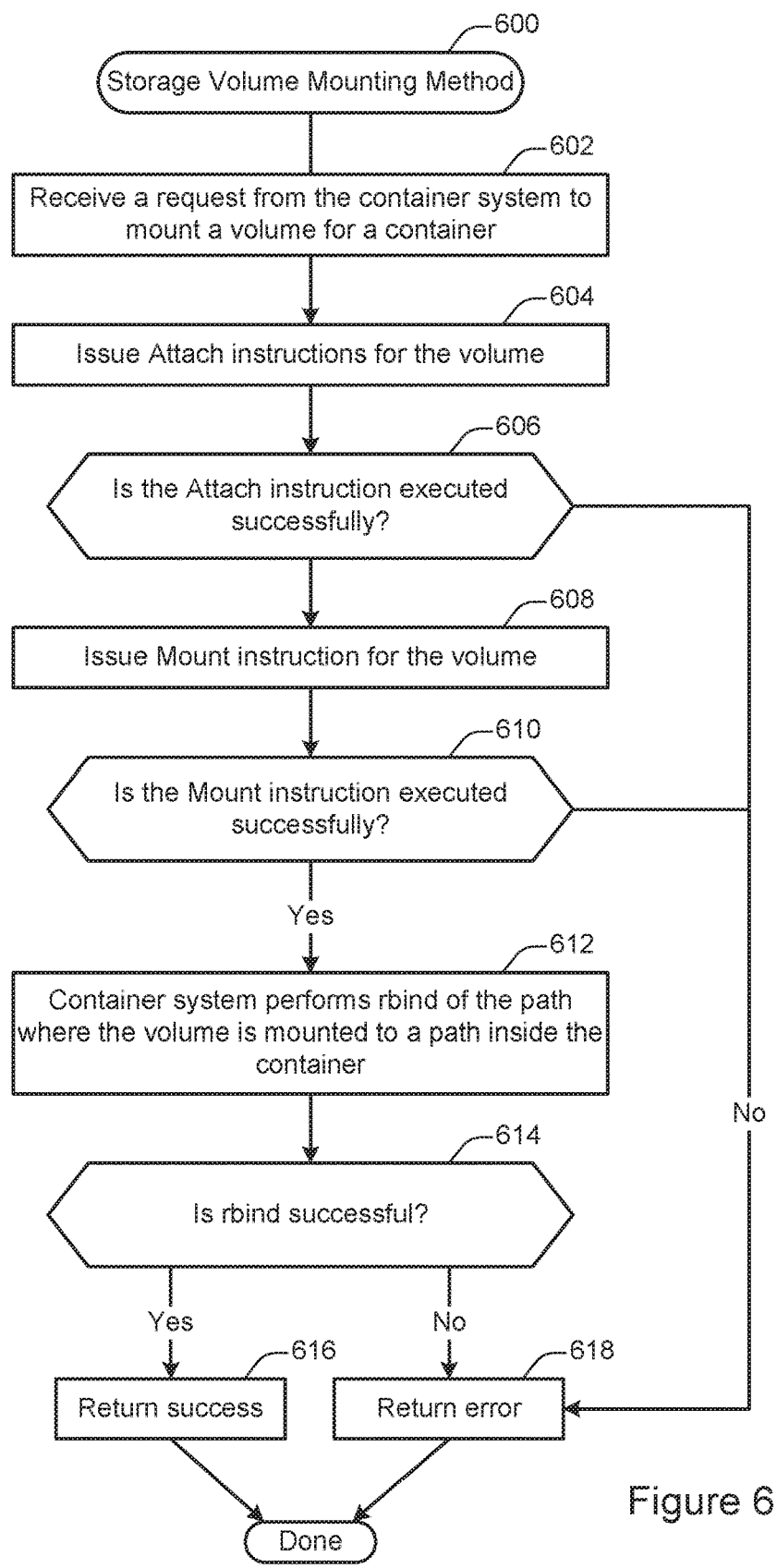
FIG. 6 illustrates a method 600 of mounting a volume in a container, performed in accordance with one or more embodiments.

FIG. 6 illustrates a method 600 of mounting a volume in a container. According to various embodiments, the method 600 may be employed to mount a volume, for instance as discussed in operation 312 shown in FIG. 3. The method 600 may be implemented at a computing node, such as the Node A 104 shown in FIG. 1.

At 602, a request is received from the container system (e.g., Docker) to mount a volume for a container. In some embodiments, the volume may be mounted in a particular application container instance executed in a containerized software system. For example, a volume may be mounted for the specific use of a MySQL instance or other application instance.

At 604, attach instructions are issued for the volume. According to various embodiments, the attach instructions may be used to attach a disk to the node. For example, the attach instructions may involve communication with one or more remote services to establish communications between the disk and the node over a network.

At 606, if it is determined that the attach instructions failed, then an error is returned at operation 618. According to various embodiments, the attach instructions may fail for any of various reasons such as network failure or a permissions error.

At 608, a mount instruction is issued for the volume. According to various embodiments, one or more standard operating system functions may be employed to mount the volume for use in the file system. At 610, if it is determined that the mount instruction failed, then an error is returned at operation 618. The mount may fail for any of various reasons, which may include, but are not limited to: file system errors, permission issues, or corrupted data.

Under a naïve configuration, a race condition may develop. For example, it is possible that before the container engine issues an rbind on a node (N1) for the mount path returned by the storage driver, another node (N2) could request the device be unmounted and detached. This is possible if multiple pods on different nodes (N1 and N2) are trying to use the same the storage driver volume. Since no process is using the block device yet, the detach would succeed on node N1. This would cause the container engine to rbind an empty local directory into the container on node N1 and cause writes to be made to a location other than the storage volume, which is not what the application would expect. The storage volume would be attached on to node N2.

According to various embodiments, to prevent this from happening, the system may ensure that an unmounted path which is rbinded by the container engine is not writeable. This can be achieved by performing the following steps during Mount( ). First, the mountpath is created. Second, a command such as "chattr +i" is used to mark the path as read-only. Third, the virtual storage volume is mounted into the mount path. The "chattr +i" command is a filesystem command which marks a filesystem path as read-only. However, this attribute is overwritten if another device is mounted on the same path, since the mount point then represents another filesystem. This ensures that if the virtual volume is not mounted in the path, then nothing will be able to perform writes in the directory, which prevents writes from erroneously going to a local path instead of the virtual storage volume as would be expected by the application.

In particular embodiments, a similar process is performed in reverse during unmounting. First, the storage driver is unmounted. Second, the "chattr" command is used to mark the path as writeable. Third, the mountpath is deleted. By performing the above steps, the system can guarantee that any attempts by the container engine to rbind the mountpath inside a container will result in the application receiving a read-only path, thereby avoiding any writes to an incorrect location.

At 612, the container system performs an rbind of the path where the volume is mounted to a path inside the container. According to various embodiments, the rbind may effectively replace the path where the volume is mounted within the operating system filesystem with a path specific to the container so that other containers or applications cannot read from or write to the volume.

At 614, a determination is made as to whether the rbind was successful. If so, a success message is returned at operation 616. If not, an error message is returned at operation 618. The rbind may fail for any of various reasons, which may include, but are not limited to: a missing source directory, file system errors, permission errors, or corrupted data.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:

1. A method to be performed by one or more processors, the method comprising:
receiving a virtual storage volume activity request message at a storage driver on a first compute node from a second compute node via a communications interface, the virtual storage volume activity request message identifying a virtual storage volume mounted at the first compute node, the virtual storage volume configured to access data stored on one or more storage devices accessible via a network;
determining, at a processor on the first compute node, whether the virtual storage volume is associated with one or more block device references in an operating system running at the first compute node, wherein the determination is made based on communications between the storage driver and a kernel module associated with the operating system; and
transmitting a virtual storage volume activity response message from the storage driver to the second compute node via the communications interface, the virtual storage volume activity response message indicating whether the virtual storage volume is associated with one or more block device references in the operating system, wherein the virtual storage volume is configured as a data storage service within a containerized application system.

2. The method recited in claim 1, wherein the containerized application system configured to run a plurality of distributed application instances within the operating system, each application instance corresponding with a designated application.

3. The method recited in claim 2, wherein the plurality of distributed applications includes the storage driver.

4. The method recited in claim 1, wherein the one or more storage devices include at least two storage devices.

5. The method recited in claim 1, wherein the request message is sent in response to a mount request to mount the virtual storage volume at the remote computing device, and wherein the virtual storage volume is in a non-responsive state in which the virtual storage volume is not responding to storage requests.

6. The method recited in claim 5, wherein the virtual storage volume is not associated with one or more block device references, and wherein a selected one of the one or more block device references comprises a respective identifier associated with a respective open file accessible via the virtual storage volume.

7. The method recited in claim 6, wherein the virtual storage volume activity response message indicates that the virtual storage volume may be safely mounted at the remote computing device.

8. A computing device comprising:
a communications interface operable to receive from a remote computing node a virtual storage volume activity request message addressed to a storage driver implemented at the computing device, the virtual storage volume activity request message identifying a virtual storage volume mounted at the computing device, the virtual storage volume configured to access data stored on one or more storage devices accessible via a network;
a processor operable to determine whether the virtual storage volume is associated with one or more block device references in an operating system running at the computing device, wherein the determination is made based on communications between the storage driver and a kernel module associated with the operating system; and
memory operable to store one or more block device references, wherein the processor is further operable to instruct the communications interface to transmit a virtual storage volume activity response message from the storage driver to the remote computing node, the virtual storage volume activity response message indicating whether the virtual storage volume is associated with one or more block device references in the operating system, wherein the virtual storage volume is configured as a data storage service within a containerized application system.

9. The computing device recited in claim 8, wherein the containerized application system configured to run a plurality of distributed application instances within the operating system, each application instance corresponding with a designated application.

10. The computing device recited in claim 9, wherein the plurality of distributed applications includes the storage driver.

11. The computing device recited in claim 8, wherein the one or more storage devices include at least two storage devices.

12. The computing device recited in claim 8, wherein the request message is sent in response to a mount request to mount the virtual storage volume at the remote computing device.

13. The computing device recited in claim 12, wherein the virtual storage volume is in a non-responsive state in which the virtual storage volume is not responding to storage requests.

14. The computing device recited in claim 13, wherein the virtual storage volume is not associated with one or more block device references.

15. The computing device recited in claim 14, wherein the virtual storage volume activity response message indicates that the virtual storage volume may be safely mounted at the remote computing device.

16. The computing device recited in claim 8, wherein a selected one of the one or more block device references comprises a respective identifier associated with a respective open file accessible via the virtual storage volume.

17. One or more machine readable media having instructions stored thereon for performing a method, the method comprising:

receiving a virtual storage volume activity request message at a storage driver on a first compute node from a second compute node via a communications interface, the virtual storage volume activity request message identifying a virtual storage volume mounted at the first compute node, the virtual storage volume configured to access data stored on one or more storage devices accessible via a network;

determining, at a processor on the first compute node, whether the virtual storage volume is associated with one or more block device references in an operating system running at the first compute node, wherein the determination is made based on communications between the storage driver and a kernel module associated with the operating system; and transmitting a virtual storage volume activity response message from the storage driver to the second compute node via the communications interface, the virtual storage volume activity response message indicating whether the virtual storage volume is associated with one or more block device references in the operating system, wherein the virtual storage volume is configured as a data storage service within a containerized application system.

18. The one or more machine readable media recited in claim 17, wherein the containerized application system configured to run a plurality of distributed application instances within the operating system, each application instance corresponding with a designated application.

19. The one or more machine readable media recited in claim 17, wherein the one or more storage devices include at least two storage devices.

20. The one or more machine readable media recited in claim 17, wherein the virtual storage volume is in a non-responsive state in which the virtual storage volume is not responding to storage requests.

* * * * *